(12) United States Patent
Pasotti

(10) Patent No.: US 10,180,524 B2
(45) Date of Patent: Jan. 15, 2019

(54) INSTRUMENT CLUSTER

(71) Applicant: MAGNETI MARELLI S.p.A., Corbetta (IT)

(72) Inventor: Alessandro Pasotti, Milan (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 221 days.

(21) Appl. No.: 14/924,811

(22) Filed: Oct. 28, 2015

(65) Prior Publication Data

US 2016/0124136 A1 May 5, 2016

(30) Foreign Application Priority Data

Oct. 30, 2014 (IT) ................ TO2014A0896

(51) Int. Cl.
*F21V 8/00* (2006.01)
*G01D 11/28* (2006.01)
(Continued)

(52) U.S. Cl.
CPC ........... *G02B 6/0033* (2013.01); *B60K 35/00* (2013.01); *B60K 37/02* (2013.01); *G01D 11/28* (2013.01);
(Continued)

(58) Field of Classification Search
CPC ................ G02B 6/0033; G01D 11/28; B60K 2350/2039; B60Q 3/10; B60Q 3/14
See application file for complete search history.

(56) References Cited

U.S. PATENT DOCUMENTS

| 8,764,208 B2 * | 7/2014 | Tomono | B60K 37/02 362/23.11 |
| 2005/0128733 A1 * | 6/2005 | Clugston | G01D 11/28 362/23.16 |

(Continued)

FOREIGN PATENT DOCUMENTS

| CN | 102414541 A | 4/2012 |
| EP | 2145160 A2 | 1/2010 |

(Continued)

OTHER PUBLICATIONS

Written Opinion and Italian Search Report dated Jun. 18, 2015 for Italian Patent Application No. TO20140896.
(Continued)

*Primary Examiner* — Jong-Suk (James) Lee
*Assistant Examiner* — Christopher E Dunay
(74) *Attorney, Agent, or Firm* — Howard & Howard Attorneys PLLC

(57) ABSTRACT

An instrument cluster is provided with a display panel having a plurality of graphic areas and with a backlighting device arranged behind the display panel for backlighting the graphic areas. The backlighting device has at least one light source and at least one light-guide element, which is provided with a receiving portion facing the light source for directly receiving a light beam and with at least one transmitting portion for transmitting and guiding the light towards at least one of the graphic areas. A cover is provided for shielding rays of light passing through the receiving portion and directed onto the display panel. The cover defines a channel, which has an inlet facing the receiving portion and at least one outlet facing one of the graphic areas. The channel is shaped in such a way as to transmit light indirectly from its inlet to its outlet.

13 Claims, 3 Drawing Sheets

(51) Int. Cl.
*G09F 13/04* (2006.01)
*B60K 35/00* (2006.01)
*B60K 37/02* (2006.01)

(52) U.S. Cl.
CPC ........ *G09F 13/04* (2013.01); *B60K 2350/206* (2013.01); *B60K 2350/2039* (2013.01); *G02B 6/0068* (2013.01)

(56) References Cited

U.S. PATENT DOCUMENTS

| | | | | |
|---|---|---|---|---|
| 2005/0146893 A1* | 7/2005 | Ford | ................ | B60K 35/00 362/560 |
| 2006/0285354 A1* | 12/2006 | Birman | ................ | B60K 35/00 362/602 |
| 2007/0236909 A1* | 10/2007 | Tamura | ................ | G02B 6/002 362/23.01 |
| 2008/0264328 A1* | 10/2008 | Birman | ................ | G01D 11/28 116/288 |
| 2011/0242789 A1* | 10/2011 | Kato | ................ | G01D 11/28 362/23.16 |
| 2015/0103509 A1* | 4/2015 | Sato | ................ | G01D 11/28 362/23.14 |
| 2015/0138751 A1* | 5/2015 | Sherman | ................ | G01D 11/28 362/23.21 |
| 2015/0321600 A1* | 11/2015 | Webb | ................ | G01D 13/28 362/511 |
| 2016/0229337 A1* | 8/2016 | Birman | ................ | G02B 6/001 |

FOREIGN PATENT DOCUMENTS

| | | |
|---|---|---|
| JP | 2008032614 A | 2/2008 |
| JP | 2013092483 A | 5/2013 |
| WO | 2007002003 A2 | 1/2007 |

OTHER PUBLICATIONS

First Office Action for Chinese Patent Application No. 201510724908.1 dated Oct. 24, 2018.

* cited by examiner

INSTRUMENT CLUSTER

CROSS REFERENCE TO RELATED APPLICATIONS

This application claims priority to and all the benefits of German Patent Application No. 10 2013 201 247.0, filed on Jan. 25, 2013, which is hereby expressly incorporated herein by reference in its entirety.

BACKGROUND OF THE INVENTION

1. Field of the Invention

The present invention relates generally to an instrument cluster, and, more specifically, to an instrument cluster for a vehicle.

2. Description of the Related Art

Instrument clusters for vehicles of the type generally known in the related art have various graphic areas shaped so as to provide corresponding information to the driver. For example, the graphic areas may represent numbers, letters, graded scales, bargraphs, logos, etc. Some graphic areas may also define aesthetic elements of the instrument cluster.

The graphic areas are defined, in general, by transparent or semitransparent portions of a polycarbonate plate. These portions are backlighted so as to render visible the corresponding information, in particular when driving at night. Normally, the polycarbonate plate is lit up by a backlighting device comprising at least one light source, of the LED type, and at least one light-guide element, which transmits the light from the light source to various areas located underneath the graphic areas. In this way, the light reaches the graphic areas by reflection and diffusion in the light-guide element so that the driver perceives visually the graphic areas in a clear and distinct way without any trouble. In addition, the backlighting device may have arrangements so as to render lighting as uniform as possible over the graphic areas distributed in various positions on the instrument cluster.

In some known solutions, in the proximity of the light source, the light-guide element has a portion shielded via a cover, which prevents the light emitted by said light source from directly reaching the polycarbonate plate in order to prevent particularly bright light spots that the driver would perceive as troublesome and/or as defects of the instrument cluster. These solutions are effective as regards attenuation or elimination of undesired light spots on the display panel, but it is not possible to envisage graphic areas positioned in the immediate proximity of the light source.

SUMMARY OF THE INVENTION

The aim of the present invention is to provide an instrument cluster, in particular for a vehicle, that will afford a simple and inexpensive solution to the problem set forth above, preferably without envisaging particular surface treatments on the materials of the light-guide element and/or without providing additional components.

Accordingly, the present invention is directed toward an instrument cluster, including a display panel having a plurality of graphic areas. A backlighting device is arranged behind the display panel for backlighting the graphic areas. The backlighting device includes at least one light source and at least one light-guide element. The light-guide element includes a receiving portion facing the light source for directly receiving a light beam emitted, in use, by the light source, and at least one transmitting portion for transmitting and guiding the light received by said receiving portion towards at least one of the graphic areas. A cover, which is made of light-proof material is arranged between the receiving portion and said display panel for shielding rays of light passing through the receiving portion and directed onto the display panel. The cover has a channel, which includes an inlet facing the receiving portion and at least one outlet facing one of the graphic areas. The channel is shaped in such a way as to transmit light indirectly from said inlet to said outlet.

Other objects, features and advantages of the present invention will be readily appreciated as the same becomes better understood after reading the subsequent description taken in connection with the accompanying drawings.

DETAILED DESCRIPTION OF THE INVENTION

Figure 1:
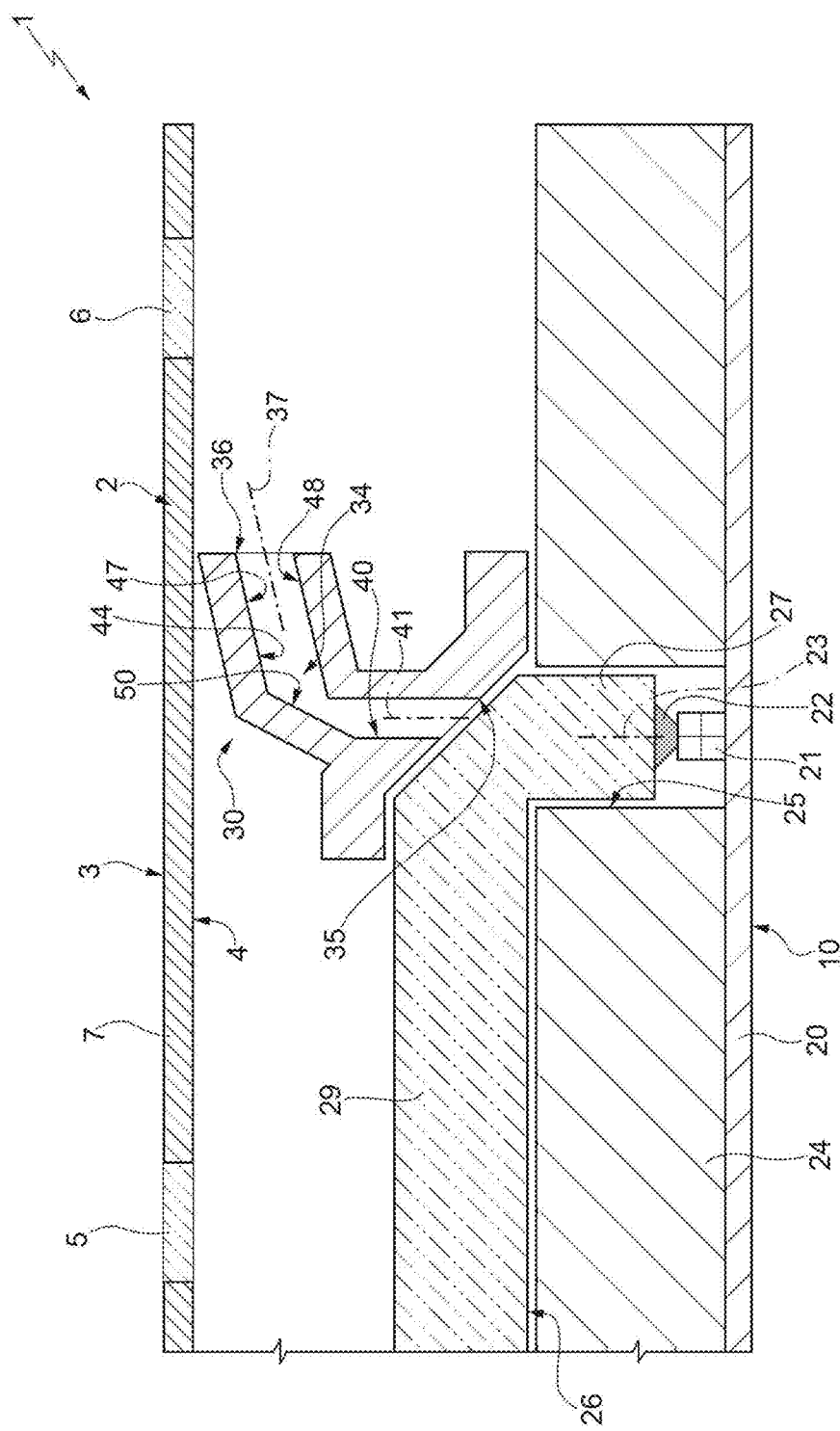
FIG. 1 is a schematic representation that illustrates, in cross-sectional view and partially, an instrument cluster, in particular for a vehicle, according to the present invention.

In FIG. 1, the reference number 1 designates, as a whole, an instrument cluster (schematically and partially represented), in particular for a vehicle. The instrument cluster 1 comprises a display panel defined by a plate 2, which is preferably made of polycarbonate and has a front face 3, that faces in use the driver, and a rear face 4, opposite to the face 3.

The plate 2 has a plurality of graphic areas, two of which are visible in FIG. 1 and are designated, respectively, by the reference numbers 5 and 6. In the particular described example, the graphic area 5 represents a mark, a graded scale, a number, a logo, a letter, a bargraph, etc. so as to provide to the driver with corresponding information on driving and/or on the state of the vehicle. On the other hand, the graphic area 6 defines an aesthetic finishing element of the instrument cluster 1. According to an alternative, the graphic areas 5 and 6 have or represent the same function.

The graphic areas 5, 6 are defined by respective light-permeable portions provided on the plate 2. The graphic areas 5, 6 are defined by transparent or semitransparent solid portions surrounded by a portion 7 of the plate 2 that is light-proof, in particular as a result of silk-screen prints made on the plate 2 itself. As an alternative, the graphic areas 5, 6 may be defined by empty spaces through the plate 2, occupied by portions of one or more light-guide elements.

In order to light up the graphic area 5 and 6, for example when driving at night, the instrument cluster 1 comprises a backlighting device 10 facing the face 4, i.e., arranged behind the plate 2. The device 10 comprises a printed-circuit board (PCB) 20, which is set apart from the plate 2 and supports at least one LED source 21 designed to emit a light beam 22. For simplicity, the LED source 21 is considered as a point-like light source. In the preferred illustrated embodiment, the PCB 20 is parallel to the face 4, whereas the LED source 21 is arranged in such a way as to emit a light beam 22 the optical axis 23 of which is orthogonal to the face 4. However, an arrangement different from the one illustrated could be envisaged, for example with optical axis 23 parallel to the face 4.

The device 10 preferably includes a body 24 which is made of light-proof material, is arranged between the PCB 20 and the plate 2 and has at least one cavity 25, having a bottom area that houses the LED source 21. The device 10 further includes at least one light-guide element 26, which is made of a material having properties such as to transmit and guide the light. The light-guide element 26 comprises at least one receiving portion or entry point 27 arranged in a position facing the LED source 21 so as to directly receive, i.e., without any reflections, the light beam 22. The portion 27 closes an outlet of the cavity 25, on the side opposite to the LED source 21. Preferably, the portion 27 is defined by a projection of the light-guide element 26, which engages an end area of the cavity 25. The light-guide element 26 further comprises a portion 29, which is arranged between the body 24 and the face 4, extends from the portion 27 as far as the areas that are arranged underneath the graphic areas 5, and transmits the light from the portion 27 as far as said areas in a way that is known and is not described in detail.

Advantageously, the portion 29 extends from the portion 27 in a direction opposite to the graphic area 6. The graphic area 6 is relatively close to the entry point 27 of the light-guide element 26, but a cover or shield 30 is provided to prevent rays of the light beam 22 from passing through the portion 27 and directly striking the face 4. In this way, the cover 30 prevents said rays from forming a relatively bright spot of light on the display panel 2.

The cover 30 is made of a light-proof material, for example plastic material, is arranged between the portion 27 and the face 4, and has a position and extension such as to perform the function of blocking the rays of light as has just been described.

In the specific case, the rays of light that, after traversing the portion 27, encounter the cover 30 are reflected by the latter towards the portion 29 of the light-guide element 25, consequently increasing the amount of light that can be transmitted by the portion 29 itself.

The cover 30 is arranged in a fixed position and, preferably, rests on the light-guide element 25, but could possibly also be set apart from the latter.

Figure 4:
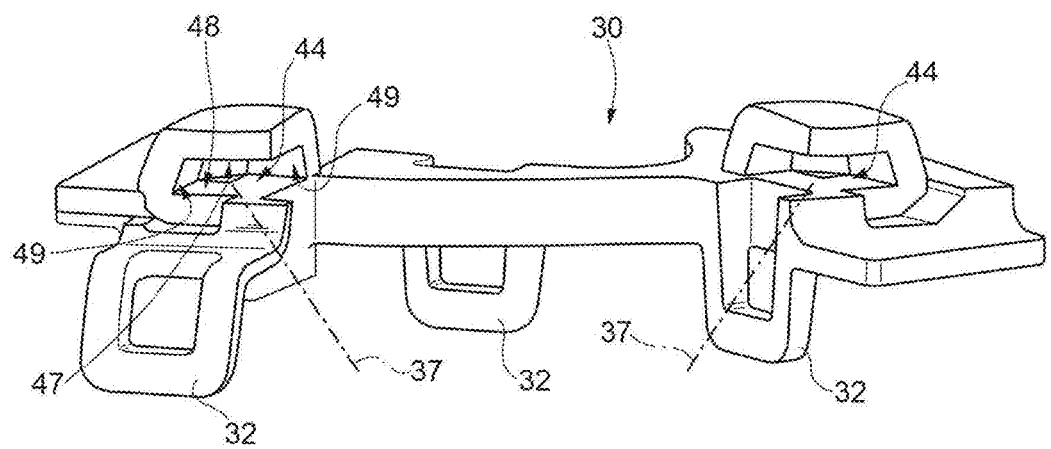
FIG. 4 is a perspective view of a component of the instrument cluster of FIG. 1.

Advantageously, as may be seen in FIG. 4, the cover 30 is fixed to the body 24 via at least one snap-action coupling element 32. However, the cover 30 could just rest on the body 24 or else could be fixed to the body 24 and/or to other fixed elements of the instrument cluster 1 via a device other than the elements 32.

Figure 5:
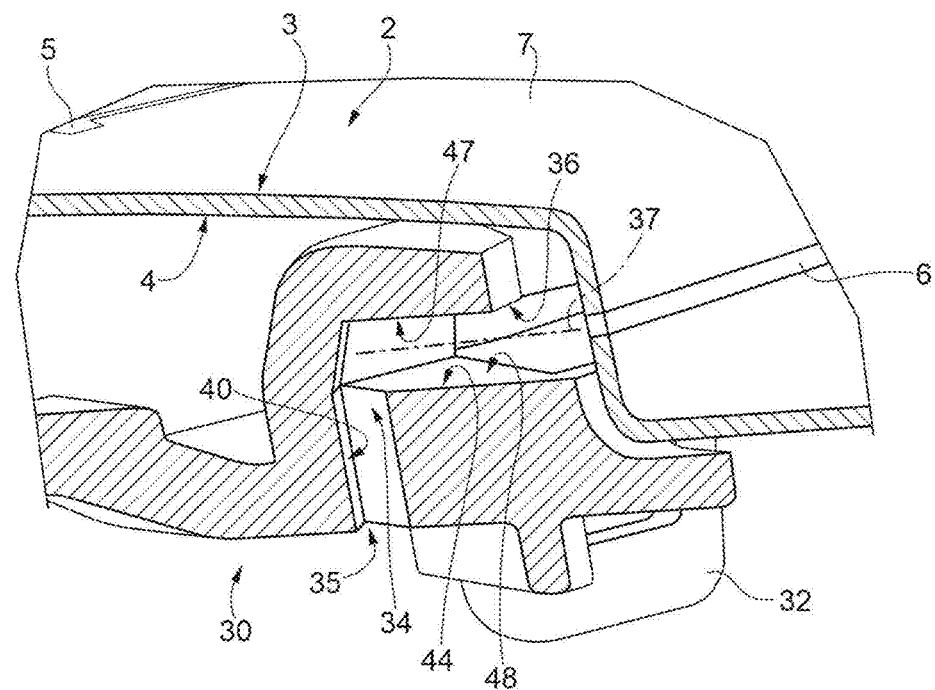
FIG. 5 shows the component of FIG. 4, according to a different perspective and in cut-away view.

With reference to FIGS. 1 and 5, according to one aspect of the present invention, the cover 30 has an internal channel 34, which is preferably empty, i.e., without internal light-guide elements, and comprises an inlet 35 facing the portion 27 for receiving a part of the light that, after being emitted by the LED source 21, has traversed the portion 27. The channel 34 has at least one outlet 36 defining a rectilinear outlet axis 37 that is oriented towards the graphic area 6. The channel 34 passes in the cover 30 continuously from the inlet 35 to the outlet 36 and is shaped in such a way as to transmit light from the inlet 35 to the outlet 36 indirectly, i.e., via reflection of the light itself on the surfaces that define the channel 34.

Advantageously, the area of the inlet 35 defines the minimum section of passage of the channel 34 and is calibrated in the design stage so as to define the amount of light that is captured by the channel 34 and is then conveyed towards the outlet 36. Preferably, the channel 34 comprises an initial portion 40, which extends, starting from the inlet 35, along an axis 41 that is rectilinear. In particular, the cross section of the portion 40 is constant along the axis 41 and is hence equal to the area of the inlet 35. The channel 34 further comprises an end portion 44, which terminates at the outlet 36, is joined to the portion 40, and extends along the axis 37. Preferably, the axes 41 and 37 are incident.

In particular, shown in FIGS. 4 and 5, at the end of the portion 40 and at the start of the portion 44 the channel 34 widens suddenly, so that the cross section of the portion 44 is greater than that of the portion 40. Advantageously, the cross section of the portion 44 increases progressively towards the outlet 36. This configuration enables diffusion of the light exiting from the portion 40 and, at the same time, makes it possible to direct it correctly towards the outlet 36 along the axis 37.

In particular, the portion 44 is delimited by two faces 47, 48 that are substantially parallel to one another and to the axis 37, and by two lateral faces 49 (FIG. 4) that join the edges of the face 47 to those of the face 48 and diverge, or are flared, towards the outlet 36. This particular configuration enables uniform lighting of a graphic area 6 that has an elongated shape with a relatively ample length (FIG. 5). The parallelism between the faces 47, 48 is approximate, in so far as an angle of incidence is envisaged, due to the need to remove the piece from the mould at the end of the injection-moulding process.

As may be seen in FIG. 1, at the end of the portion 40 and the start of the portion 44 the cover 30 has a surface 50 on which the point of incidence between the axes 41, 37 preferably lies. The surface 50 is shaped and oriented in such a way as to reflect the light proceeding along the axis 41 and direct it towards the axis 37. Preferably, the surface 50 is plane, and the bisectrix of the angle formed between the axes 41 and 37 is orthogonal to the surface 50.

As shown in FIGS. 4 and 5, preferably the cross section of the portion 40 is triangular and, at the same time, the surface 50 extends as prolongation of a side of the triangular cross section. In this way, the diffusion of the light that has been captured and transmitted by the portion 40 is further optimized.

Figure 2:
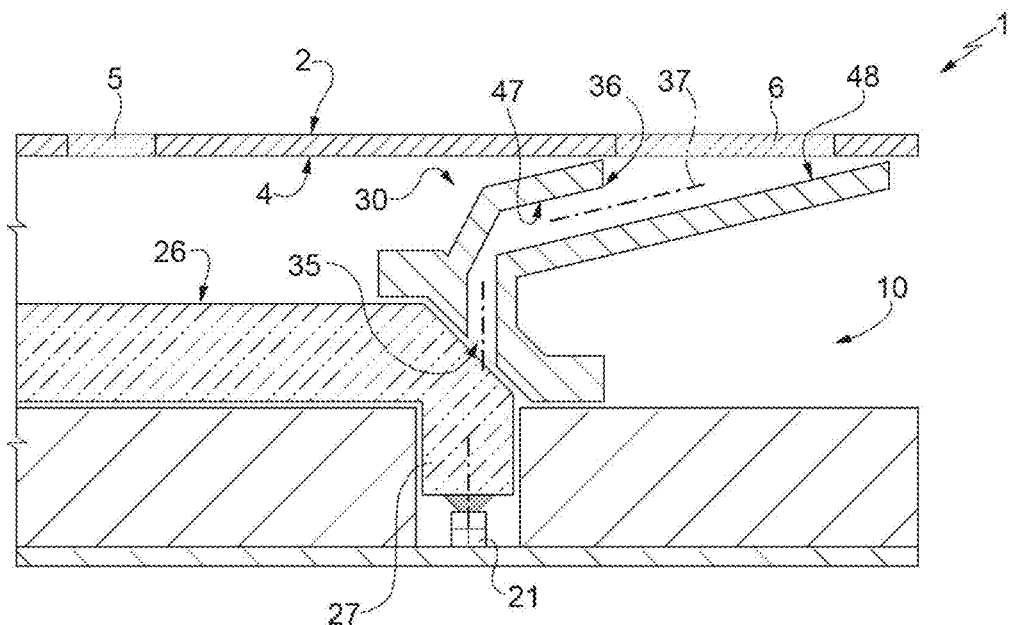
FIG. 2 is similar to FIG. 1 and illustrates, at a reduced scale, a variant of the instrument cluster of FIG. 1.

According to the variant of FIG. 2, the portion 44 has a length greater than the one represented in FIG. 1 so as to bring the outlet 36 closer up to the graphic area 6. In particular, the face 48 has a length greater than that of the face 48 in a direction parallel to the axis 37, for blocking any dispersion of light in a direction opposite to the face 4.

Figure 3:
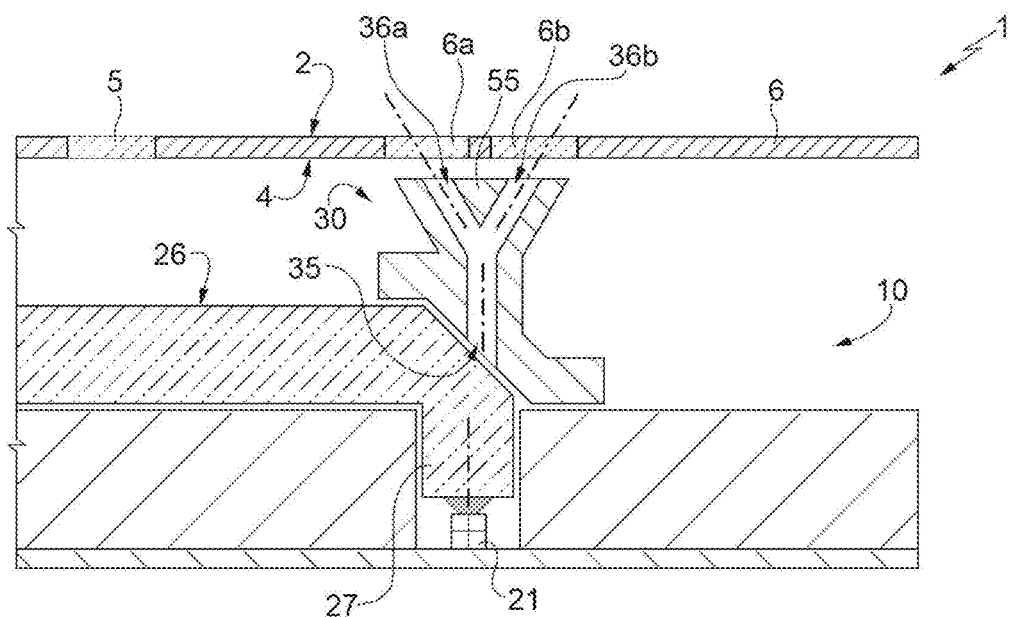
FIG. 3 is similar to FIG. 1 and illustrates, at a reduced scale, another variant of the instrument cluster of FIG. 1.

According to the variant of FIG. 3, the surface 50 is absent, and the channel 34 has two distinct outlets 36a and 36b, in particular to be able to light up two graphic areas 6a and 6b set apart from one another. In other words, at the end of the portion 40 the channel 34 comprises a bifurcation for splitting the light that has been captured and transmitted by the portion 40. In particular, said bifurcation is defined by a portion 55 of the cover 30 that is arranged between the outlets 36a and 36b and has a position, extension, and geometry that are defined in the design stage in such a way as to: prevent the light transmitted by the portion 40 from proceeding directly, i.e., without undergoing any reflection, from the portion 27 to the outlets 36a and/or 36b; and split into parts that are as equal as possible the amount of light transmitted by the portion 40.

In view of the description as set forth above, it is evident that the cover 30 according to the present invention continues to perform its own normal function of shield, in order to prevent formation of undesired light spots on the display panel 2, due to light coming directly from the entry point 27, but at the same time enables lighting of at least one graphic area 6 the position of which is relatively close to that of the entry point 27 itself.

It is then evident that the solution envisaged for the cover 30 does not entail additional components or machining operations or specific treatments. Consequently, this solution has a relatively contained cost and has overall dimensions substantially identical to those of known solutions. In particular, no additional silk-screen treatments are necessary for rendering the surface uniform; in addition, it is possible to obtain the channel 34 directly during moulding of the plastic material of the cover 30.

The specific characteristics of the channel 34 described above with reference to the attached figures regard particular configurations of the cover 30 and enable secondary advantages of the invention to be achieved, which have been described above and/or are evident to a person skilled in the sector.

Finally, it is evident that modifications and variations may be made to the instrument cluster 1 described with reference to the attached figures, without thereby departing from the sphere of protection of the present invention, as defined in the annexed claims. For example, the shape and dimensions of the inner surfaces that define the channel 34 could be different from what has been described. The cover 30 could provide a number of channels 34 different from what has been described and illustrated, even though the preferred solution envisages one single channel 34 for each entry point 27. Moreover, the instrument cluster 1 could be used in applications other than the vehicle sector and/or could exploit light sources other than LED sources.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An instrument cluster, in particular for a vehicle, comprising:
   a body made of light-proof material and having a cavity;
   a display panel having a plurality of graphic areas;
   a backlighting device arranged behind said display panel for backlighting said graphic areas; the backlighting device comprising at least one light source that is housed in said cavity of said body, and at least one light-guide element, said light-guide element including a receiving portion facing said light source for directly receiving a light beam emitted, in use, by said light source, and at least one transmitting portion for transmitting and guiding the light received by said receiving portion towards at least one of said graphic areas;
   a cover supported by said body and arranged in a fixed position with respect to said light source, said cover made of light-proof material and disposed between said receiving portion and said display panel for shielding rays of light passing through said receiving portion and directed onto said display panel; and
   wherein said cover has a channel, which comprises an inlet facing said receiving portion and at least one outlet facing one of said graphic areas, said channel being shaped in such a way as to transmit light indirectly from said inlet to said outlet.

2. The instrument cluster as set forth in claim 1, wherein said channel has a cross section which defines the smallest area of said channel at said inlet.

3. The instrument cluster as set forth in claim 1, wherein said channel comprises an initial portion, which extends starting from said inlet along a first rectilinear axis.

4. The instrument cluster as set forth in claim 3, wherein said initial portion has a cross section that is constant along said first rectilinear axis.

5. The instrument cluster as set forth in claim 3, wherein said outlet is provided along a second rectilinear axis that intersects with said first rectilinear axis.

6. The instrument cluster as set forth in claim 5 wherein said channel comprises an end portion, which extends along said second rectilinear axis and terminates at said outlet.

7. The instrument cluster as set forth in claim 6, wherein the cross section of said initial portion is smaller than that of the said end portion.

8. The instrument cluster as set forth in claim 6, wherein the cross section of said end portion increases towards said outlet.

9. The instrument cluster as set forth in claim 8, wherein said end portion is defined by two faces that are parallel to one another and to said second rectilinear axis and by two lateral faces that diverge away from each other.

10. The instrument cluster as set forth in claim 6, wherein said initial and end portions are joined by a surface that is shaped and oriented in such a way as to reflect the light from said first rectilinear axis to said second rectilinear axis.

11. The instrument cluster as set forth in claim 10, wherein the cross section of said initial portion is triangular, and in that said surface extends starting from one side of the triangular cross section.

12. The instrument cluster as set forth in claim 1, wherein said channel is empty.

13. The instrument cluster according to claim 1, wherein said cover is fixedly coupled to said body.

* * * * *